Oct. 27, 1931.  P. S. SHIELD  1,829,020
FLUID PRESSURE CONTROL OF VEHICLE TANK VALVES
Filed Aug. 20, 1925   3 Sheets-Sheet 1
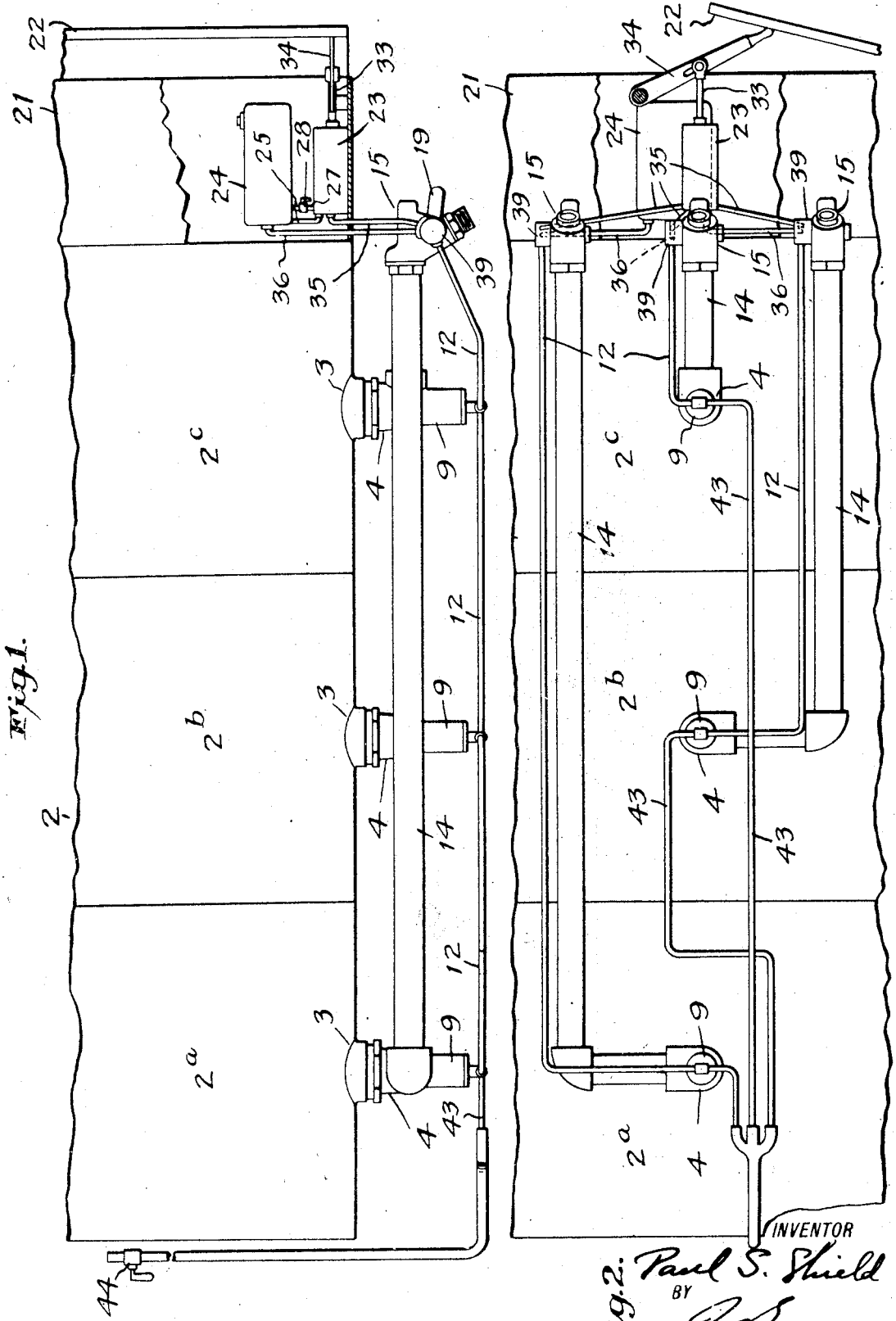

Oct. 27, 1931.  P. S. SHIELD  1,829,020
FLUID PRESSURE CONTROL OF VEHICLE TANK VALVES
Filed Aug. 20, 1925  3 Sheets-Sheet 2
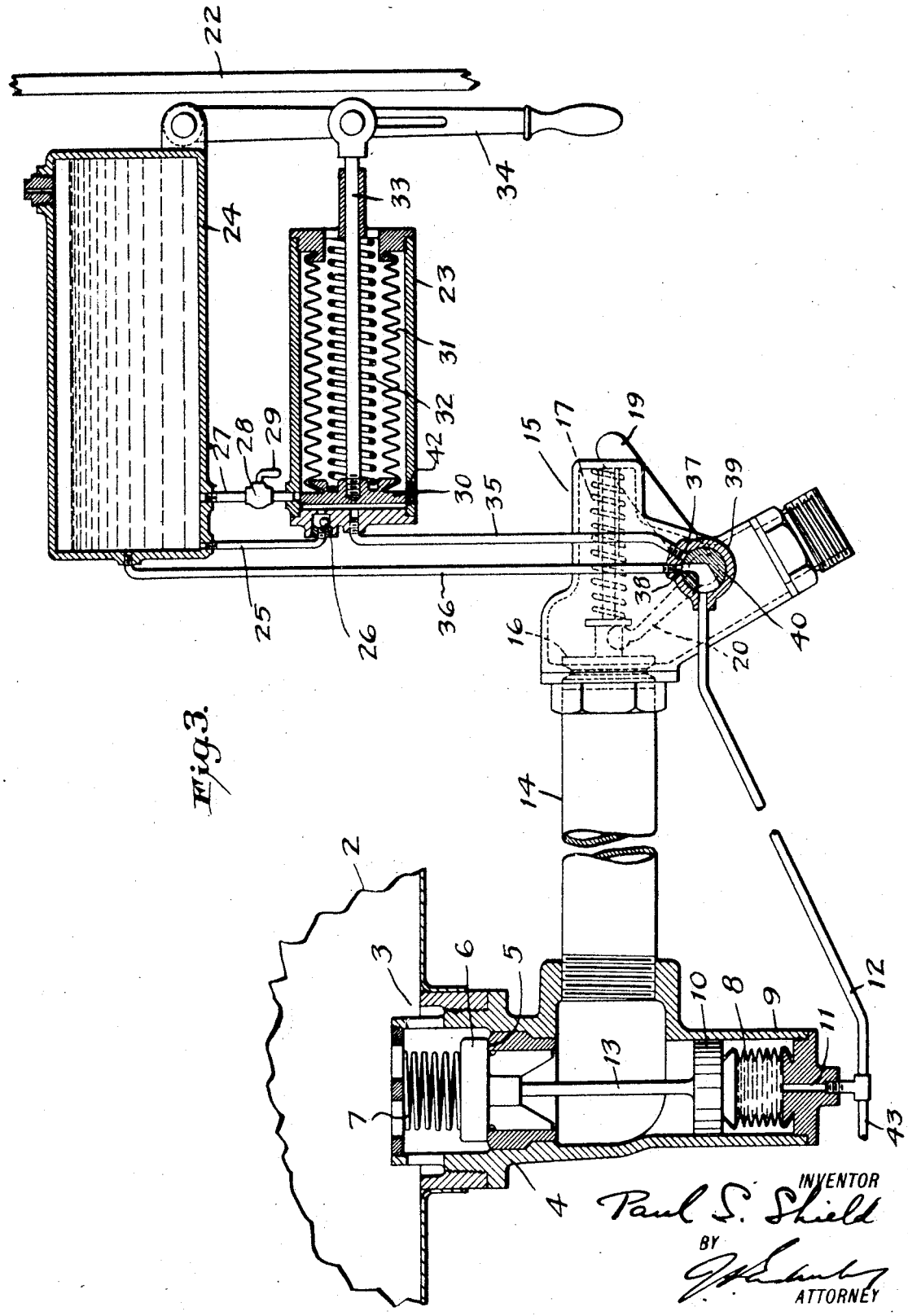

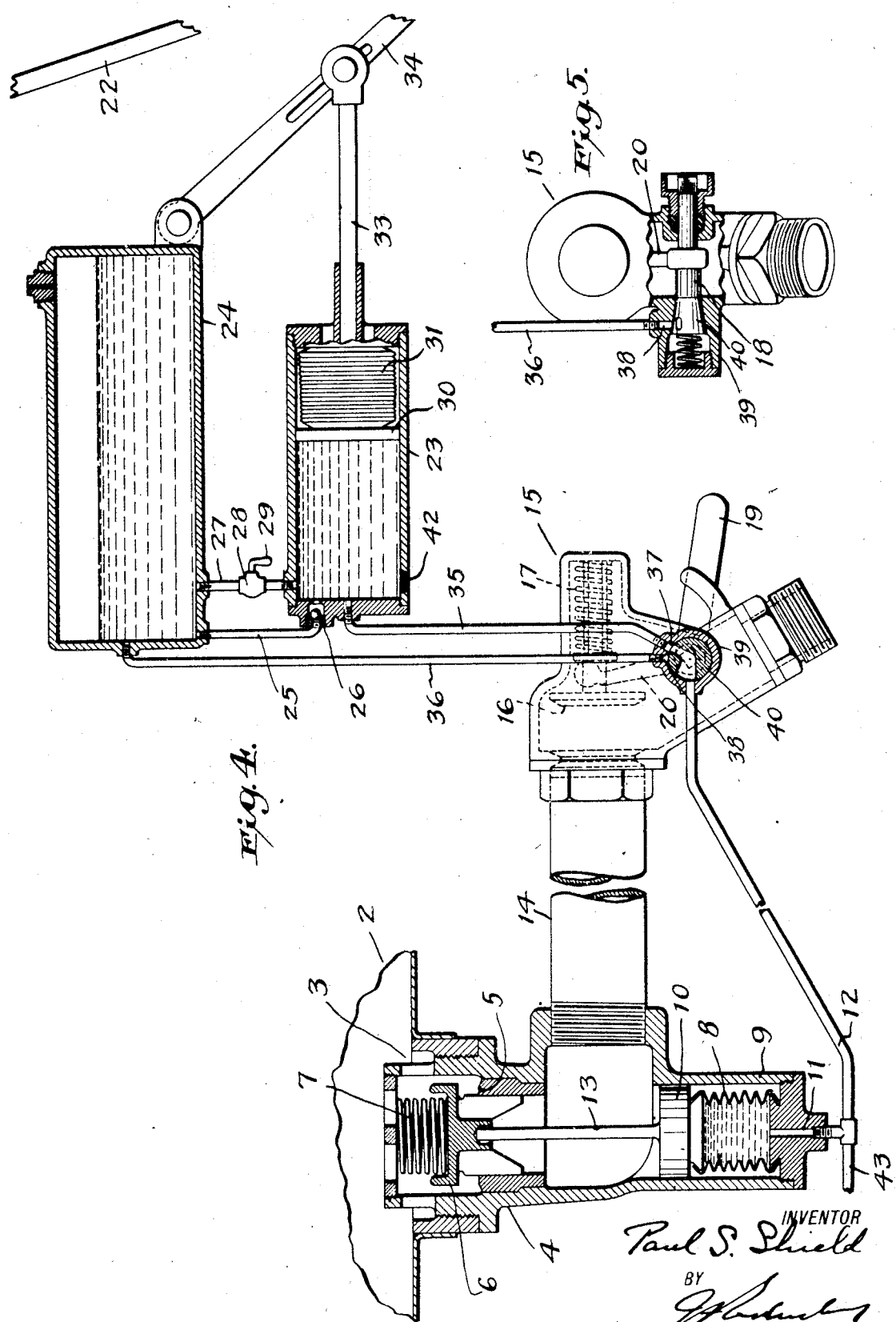

Patented Oct. 27, 1931

1,829,020

UNITED STATES PATENT OFFICE

PAUL S. SHIELD, OF CINCINNATI, OHIO, ASSIGNOR TO AUGUSTINE DAVIS, JR., OF CINCINNATI, OHIO

FLUID PRESSURE CONTROL OF VEHICLE TANK VALVES

Application filed August 20, 1925. Serial No. 51,365.

This invention has to do with tanks, and particularly vehicle tanks for making deliveries of inflammable liquids such as gasoline. In addition to the faucets or delivery valves of these tanks it is important to provide safety valves or "emergency" valves commanding the tank outlets, so that, if the delivery lines or faucets should be broken by collision or any other accident, the dangerous contents of the tank will not be discharged upon the roadway.

The purpose of the invention is to provide a simple, convenient and reliable fluid-pressure system for controlling such safety valves, whereby the tank is very effectually safeguarded, and in which fluid-pressure connections between the safety valves and a source of pressure are controlled by or with the operation of the faucets.

Another object of the invention is to provide a multiple-pressure system for controlling the safety valves of the several tank compartments, in which the closing of any or all of the safety valves that may be open is insured in event of fire by a fusible means located in a common part of the fluid-pressure system.

With these and other objects in view, the invention may be said to consist in the parts, improvements and combinations hereinafter described and more particularly pointed out in the claims.

In the accompanying drawings forming part hereof:

Fig. 1 is an elevation of a truck tank with the upper part broken away and with the lower portion of a bucket-box broken out and in section, the valve mechanism being illustrated in the open condition;

Fig. 2 is a bottom plan with portions broken away;

Fig. 3 is a somewhat schematic sectional view on a larger scale, showing the safety valve of one of the compartments and the mechanism in the closed condition;

Fig. 4 is a view similar to Fig. 3, showing the mechanism in the open condition; and Fig. 5 is an end view partly in section of one of the faucets and its connections.

The truck-tank 2 comprises several compartments $2^a$, $2^b$, $2^c$, each having a bottom outlet 3. A fitting 4 screwed upward into each outlet contains a valve seat 5 upon which a safety or emergency valve 6 seats downwardly under the action of gravity, the liquid, and/or a spring 7, to close the outlet. A fluid-pressure actuated device such as an expansible fluid receptacle is seen at 8 in the lower part 9 of each fitting. The piston or head 10 of this device is connected with the bottom of the fitting by a bellows-like enclosure of flexible metal, which prevents all possibility of leakage between this fluid-pressure chamber and the interior of the tank or the delivery piping. A suitable liquid under pressure is admitted to and allowed to escape from the fluid-pressure actuated device 8 through a duct 11, with which is connected a conduit 12. A rod or stem 13 forms an operative connection between each of the devices 8 and its safety valve, for unseating the latter.

Delivery pipes 14 extend rearward beneath the tank from the several outlet fittings to the rear end of the vehicle, where they are provided with faucets 15, the valves of which are marked 16. These valves are customarily of the quick-closing disc type, having closing springs 17. Spindles 18 are operated by wrenches or handles 19 and operate the valves through arms 20. The invention is not necessarily limited, however, to the particular kind of valves.

A bucket-box 21 is mounted on the vehicle at the rear end of the tank, and this box has a door 22. Located in such a box is a pressure chamber or cylinder 23 and a reservoir 24. An inlet pipe or passage 25 connects the reservoir with the forward part of the pressure chamber, and a check-valve 26 in this passage operates automatically to permit liquid to pass from the reservoir to the pressure chamber and to hold it against return. Means are provided, however, for releasing liquid and pressure from the pressure chamber back to the reservoir. The form and arrangement of such means may be varied, but a desirable provision consists of a second, by-pass pipe 27 connecting the chambers and containing a turn-cock or valve 28 having a handle 29.

The piston or plunger 30 of the fluid-pressure chamber 23 is made tight by a bellows 31, and is urged in the direction to exert pressure on the liquid in the chamber by a spring 32. This pressure producing device is retracted, that is to say moved in the direction to draw fluid into the chamber from the reservoir and to store power in the spring 32, by means of a rod 33 and a hand lever or operating connection 34.

Pressure or supply lines 35, corresponding in number to the safety valves, are in connection with the forward end of the chamber 23; and an equal number of return lines 36 connect with the reservoir 24. The other ends of the conduits 35 and 36 connect with ports 37 and 38 of valve bodies 39 shown formed integrally on the bodies of the several faucets 15. A two-way turn-cock valve 40 in each of these bodies is adapted to connect the corresponding lines 35 and 36 alternately with one of the lines 12 heretofore referred to. The control valves 39 are shown formed on the ends of the operating spindles 18. The relations are such that when one of the faucets is opened the control valve connects the pressure line 35 with the line 12 to open the corresponding safety valve 6, and when the faucet is closed the former communication is closed and the line 12 is connected with the return line 36, so that the pressure in the device 8 is relieved and liquid returned therefrom to the reservoir 24.

The desirable simplicity of the illustrated form of control valve means for the fluid-pressure system, and its interconnection with the delivery or faucet valves, will be apparent, but I do not wish to limit myself to a particular style of valve or valves, and the interconnection of the control and delivery valves may be more or less immediate than is shown.

When the vehicle is at rest and a delivery is to be made, the driver opens the door 22 and pulls out the handle or operating connection 34. It may be noted that a connection with the source of pressure forms an interlock with the door, so that the pressure must be relieved from the fluid-pressure system when, or before, the door is closed. This may be accomplished in specifically different ways, but as shown the handle 34 when pulled out to retract the pressure-producing device is in the way of the closing of the door. Consequently, if after making the delivery there should be pressure left in the system, which might result in any one of the safety valves being accidentally, mischievously or fraudulently opened, this pressure must be relieved by opening the valve 28 so as to release the pressure from the chamber into the reservoir.

Pulling on the connection 34 stores up power in the spring 32 or its equivalent, putting pressure on the liquid trapped in the chamber 23 and in the several lines 35. The operator then applies the wrench to one of the faucet spindles and opens the faucet. This applies the fluid pressure to the fluid-pressure actuated device 8 of the corresponding safety valve 6, so that that valve is opened, permitting gasoline to flow through the pipe 14 to and through the open faucet. When the faucet is closed, the pressure in the device 6 is released back to the reservoir 24 as already described, resulting in the closing of the emergency valve. The capacity of the fluid pressure chamber 23 is much greater than the capacity of any one of the safety valve operating devices 8, so that the one setting of the fluid-pressure system will furnish power for a number of operations of a faucet and its corresponding safety valve.

Another important provision is a fusible portion 42 of the wall of the fluid-pressure chamber 23, or one or more of such fusible wall portions elsewhere in the pressure confining system. In case of fire this wall portion will melt, whereupon the liquid escapes and any open safety valve 6 is immediately closed. This results from the fact that the fusible element is combined with the part of the fluid-pressure control system which is common to all the branches leading to the several safety valves. Specifically, the fusible element is associated with the operating device 23. Consequently, the fusing of this element will insure the immediate closing of any one of the safety valves that may have been selected and may then be open, or of any two or more of the safety valves if more than one of them should be open at the same time.

Lines 43 extend from the fluid-pressure actuated devices of the several emergency valves to the forward or cab end of the tank vehicle, where they are closed by a valve 44. Opening of this valve in case of emergency will likewise release the pressure and cause the safety valves to close.

There may be various changes in details, proportions and arrangements without affecting the invention. The invention is obviously not limited to the use of liquid as the fluid pressure means.

What I claim as new is:

1. In combination with a vehicle tank having an outlet in the bottom wall thereof, a delivery pipe leading from said outlet to provide a gravity discharge conduit for said tank, a normally closed safety valve commanding the discharge from tank to conduit, and a second valve in the delivery pipe at a point remote from the safety valve, a fluid-pressure actuated device for operating said safety valve, control valve means interconnected with the second valve controlling the application and release of fluid pressure on said device, a reservoir, a fluid-pressure chamber connected with said reservoir, pressure and return conduits connecting said control valve means with the fluid-pressure chamber and the reservoir respectively, spring-actuated means for exerting pressure upon fluid in the fluid-pressure chamber, and means for retracting said spring-actuated means, said fluid-pressure chamber and spring-actuated means being of capacity for repeated operations of the delivery valve and safety valve system.

2. In a tank vehicle, the combination of a plurality of tank chambers each provided with an outlet and discharge conduits connected therewith, a safety valve normally closing the outlet from each chamber, a fluid-pressure device having a manually operated piston and means including said device for opening said safety valves, a portion of the fluid-pressure device comprising fusible material whereby release of operating pressure and closure of all of said safety valves is ensured upon the fusing of said material in case of fire.

3. The combination with a truck tank which is subdivided into a number of compartments for making deliveries of liquid, of normally closed fluid-actuated safety valves closing the outlets of the several compartments, delivery conduits extending from the several safety valves, delivery valves at the ends of said conduits, a common source of fluid pressure, lines connecting the same with the respective safety valves, and control valves in said lines positively connected with the respective delivery valves, whereby the opening of any one of the delivery valves permits application of fluid pressure only to the safety valve of the tank compartment connected with that delivery valve to open the same, whilst closing of said delivery valve automatically releases pressure from said safety valve so that it closes.

4. The combination with a truck tank which is subdivided into a number of compartments for making deliveries of liquid, of normally closed fluid-actuated safety valves closing the outlets of the several compartments, delivery conduits extending from the several safety valves, delivery valves at the ends of said conduits, control valves positively connected to the several delivery valves, a source of operating fluid and means for applying pressure thereto, pressure lines leading to the several control valves, lines connecting the several control valves with the several safety valves, and return lines from the several control valves to said source, whereby the opening of any one of the delivery valves permits application of fluid pressure only to the safety valve of the tank compartment connected with that delivery valve to open the same, whilst closing of said delivery valve opens the corresponding return line to allow said safety valve to close.

5. The combination with a truck tank having a plurality of compartments each provided with an outlet, and a delivery system comprising piping connected with the outlets and a plurality of normally-closed valves respectively closing the outlets, of a fluid-pressure valve-operating system non-communicating with said delivery system, said fluid-pressure system comprising fluid-pressure-actuated devices associated with the respective outlet valves, branches connected with the several fluid-pressure-actuated devices, a common part connected with all the branches, means for controlling the application of fluid-pressure from said common part of the valve-operating system through any one of said branches to open any one of the outlet valves, and means comprising a fusible portion of a fluid-pressure-confining wall of said common part to bring about closing of any open outlet valve in event of fire.

6. The combination with a truck tank having a plurality of compartments each provided with an outlet, and a delivery system comprising piping connected with the outlets and a plurality of normally-closed valves respectively closing the outlets, of a fluid-pressure valve-operating system non-communicating with said delivery system, said fluid-pressure system comprising a fluid-pressure cylinder and fluid-pressure-actuated devices associated with the respective outlet valves, branches connected with the several fluid-pressure-actuated devices and with said fluid-pressure cylinder, means including said cylinder, branches and fluid-pressure-actuated devices for opening said outlet valves to effect delivery and temperature-responsive means incorporated in said cylinder for releasing the pressure in the fluid-pressure system to bring about closing of any open outlet valve in event of fire.

PAUL S. SHIELD.